United States Patent [19]

Shaw et al.

[11] 4,196,219
[45] Apr. 1, 1980

[54] METHOD OF EXTENDING THE STORAGE LIFE IN THE FROZEN STATE OF PRECOOKED FOODS AND PRODUCT PRODUCED

[75] Inventors: Carol P. Shaw; John L. Secrist, both of Medfield; Justin M. Tuomy, Framingham, all of Mass.

[73] Assignee: The United States of America as represented by the Secretary of the Army, Washington, D.C.

[21] Appl. No.: 959,264

[22] Filed: Nov. 9, 1978

[51] Int. Cl.² .......................... A23B 4/06; A23B 4/10
[52] U.S. Cl. ........................................ 426/89; 426/92; 426/100; 426/302
[58] Field of Search .................. 426/89, 92, 302, 310, 426/100

[56] References Cited

U.S. PATENT DOCUMENTS

| 3,395,024 | 7/1968 | Earle | 426/291 |
| 3,453,120 | 7/1969 | Olson et al. | 426/302 X |

*Primary Examiner*—Arthur D. Kellogg
*Attorney, Agent, or Firm*—Nathan Edelberg; Robert P. Gibson; Lawrence E. Labadini

[57] ABSTRACT

A method of extending the storage life of cooked foods, such as meats, poultry and fish in the frozen state comprising, cooking the food, coating the cooked food with an edible coating the composition of which comprises the calcium salt of carrageenan, freezing the food coated with said calcium salt of carrageenan, and storing said coated food in the frozen state.

5 Claims, No Drawings

METHOD OF EXTENDING THE STORAGE LIFE IN THE FROZEN STATE OF PRECOOKED FOODS AND PRODUCT PRODUCED

The invention described herein may be manufactured, used, and licensed by or for the Government for governmental purposes without the payment to us of any royalty thereon.

BACKGROUND OF THE INVENTION

Large quantities of precooked meat, poultry, and fish are sold annually in the form of frozen precooked entrees, frozen dinners, frozen precooked fish portions, and the like for human consumption after a brief thawing and warming of such precooked foods to a temperature suitable for consumption thereof. Thus, much time is saved in the preparation of meals in the home, for use in aircraft, and in some cases for serving in restaurants.

A major drawback in this procedure has been the rapid deterioration in texture while a precooked food product remains in frozen storage. This texture deterioration is due to the loss in moisture (dehydration) of the food product and is commonly referred to as "freezer burn." Consequently, there are many people who find the texture of precooked frozen meats, poultry and fish objectionable even though the products have been stored in the frozen state for only a short time.

It has been proposed by R. D. Earle in U.S. Pat. No. 3,395,024 that various fresh foods, such as meat, seafood, poultry and the like be provided with a coating of an algin dispersion containing a carbohydrate comprising a monosaccharide or disaccharide dissolved in water, then treated with an aqueous gelling solution containing calcium ions to firmly bond the coating to the food, one objective being to extend the storage life of fresh meats, seafood, poultry and the like. Various naturally-occurring and synthetic gums are disclosed as thickeners for use in the gelling solution containing calcium ions. However, all of these coatings are suggested for application to fresh, uncooked foods only.

It is an object of the invention to extend the storage life in the frozen state of precooked foods such as precooked meat, poultry, and fish.

It is a further object of the invention to reduce the rate of moisture loss from precooked foods such as precooked meat, poultry, and fish during storage thereof in the frozen state.

It is also an object of the invention to create no objectionable flavors due to the edible coating itself while the food is being consumed and to prevent any appreciable increase in the rate of oxidative degradation of precooked foods such as precooked meat, poultry and fish during storage thereof in the frozen state.

It is a further object of the invention to provide the moisture-loss protection by the use of a food grade edible coating which can be heated with the food product and consumed along with the food product.

Other objects and advantages will become apparent in the course of the following description of the practice of the invention.

SUMMARY OF THE INVENTION

The method comprises coating a precooked food such as a precooked meat, poultry or fish product with an edible coating the composition of which is comprised of an aqueous dispersion of the calcium salt of carrageenan and freezing the precooked food coated with the aqueous dispersion of the calcium salt of carrageenan, the calcium salt of carrageenan being applied in a substantially uniformly thick coating thereof on the food. The coating of the calcium salt of carrageenan adheres tightly to the surfaces of the food, protecting the food against loss of moisture during frozen storage thereof and is itself sufficiently free of objectionable flavors and of adverse textural effects to permit the coated food to be eaten after thawing of the precooked food and warming thereof to a temperature suitable for eating of the food without further preparation and with the coating remaining in place on the surfaces of the precooked food.

DESCRIPTION OF THE PREFERRED EMBODIMENTS

The material used in the coating composition of the invention is the calcium salt of carrageenan, and more particularly the product of Stauffer Chemical Company, Westport, Conn., known as "Carastay" Type 94 carrageenan. Calcium is the predominant cation in this material.

Carrageenan is defined in the "Code of Federal Regulations," Title 21 - Food and Drugs, Section 172.620, Apr. 1, 1977, as being a refined hydrocolloid prepared by aqueous extraction from the following members of the families Gigartinaceae and Solieriaceae of the class Rhodophyceae (red seaweed): Chondrus crispus, Chondrus ocellatus, Eucheuma cottonii, Eucheuma spinosum, Gigartina acicularis, Gigartina pistillata, Gigartina radula, Gigartina stellata. It is a sulfated polysaccharide the dominant hexose units of which are galactose and anhydrogalactose. The range of sulfate content is 20 percent to 40 percent on a dry-weight basis.

The salts of carrageenan are defined at Section 172.626 of the above-referenced "Code of Federal Regulations" as being carrageenan modified by increasing the concentration of one of the naturally occurring salts (ammonium, calcium, potassium, or sodium) of carrageenan to the level that it is the dominant salt in the additive material. The calcium salt is the dominant salt of carrageenan in "Carastay" Type 94 carrageenan.

The following examples illustrate the practice of the present invention.

EXAMPLE 1

Boneless strip beef loins were trimmed substantially free of excess fat and cut into steak portions weighing approximately 113 grams each. The beef loin steaks were cooked on a lightly oiled grill to an internal temperature of about 60° C. The steaks were then cooled to an internal temperature of approximately 10° C. The cooked steaks had average weights of approximately 85 grams.

The steaks were divided into two groups, one group to be coated and frozen, the other group to remain uncoated and to be frozen to serve as controls for the first group of coated steaks. The steaks of the second group were individually placed in aluminum foil pans having dimensions of about 11.5 cm long, 8.5 cm wide, and 2.5 cm deep and covered with aluminum foil-cardboard laminated covers.

A coating dispersion of a calcium salt of carrageenan was prepared by mixing 45 grams of "Carastay 94," a calcium salt of carrageenan manufactured and sold by Stauffer Chemical Co., Westport, Conn., in 4536 grams of water and heating the mixture with stirring to 60° C. The dispersion was cooled to 38° C. Each steak of the first group of steaks was individually submerged in the dispersion of the calcium salt of carrageenan, then withdrawn from the dispersion, allowing the excess of dispersion to drain off, the dipcoated steak then being placed in an aluminum foil pan such as those employed for the control steaks. This resulted in the application of about a 10 percent by weight (based on the weight of the meat) coating of the approximately 1.0% dispersion of the calcium salt of carrageenan to each steak of the first group, amounting to about 0.1% of the calcium salt of carrageenan plus about 9.9% water. The coating was relatively uniform in each case, with about 8.5 grams of the dispersion of the calcium salt of carrageenan applied to each cooked steak of about 85 grams weight, of which about 0.085 grams of calcium salt of carrageenan was coated on each steak. The coated steaks were covered as in the instances of the control steaks and all of the coated steaks, as well as the control steaks, were blast frozen at about −29° C. for 24 hours. At the end of this blast freezing step, four steaks from each group were removed from the freezer for initial testing while the other frozen steaks were maintained in frozen storage at about −18° C. for six months.

The steaks for initial testing were tempered at about 4° C. overnight, then reheated at about 163° C. in a convection oven for approximately twenty minutes to an internal temperature of about 71° C. for each steak. The reheated steaks were then rated by a panel of ten food technologists experienced in rating cooked meats, using a hedonic scale of from 1 to 9 for the sensory attributes of flavor and texture. In this hedonic scale testing a value of 9 represents excellent, while a value of 1 represents extremely poor and a value of 5 represents fair and is considered to correspond to the borderline of acceptability, while a value of 6 represents above fair but below good, a value of 7 represents good, and a value of 8 represents very good.

Following the initial testing and the beginning of frozen storage of other steaks from the two groups, enough steaks were withdrawn from frozen storage to permit testing the coated steaks and the uncoated (control) steaks after six months of frozen storage. Each batch of steaks withdrawn from frozen storage was tempered at about 4° C. overnight, then reheated in a convection oven at about 163° C. to an internal temperature of about 71° C. The reheated steaks were then tested by a similar panel of ten experienced food technologists and the steaks were rated in the same manner as for the initial ratings of the coated and uncoated steaks. The results of these tests as well as the results of the initial rating test for coated and uncoated precooked and frozen beef loin steaks are given in Table 1 below along with hedonic scale test results for other meats and fish. Each value represents the average of the values assigned by ten panel members.

EXAMPLE 2

Top round of beef was trimmed free of excess fat and ground, using a plate having 4.8 mm openings therein. The ground beef was formed into rectangularly shaped patties in a Hollymatic forming machine, each patty weighing approximately 128 grams. The patties were broiled in an electric oven until they were medium well done, showing an internal temperature of about 63° C. The patties were then cooled to an internal temperature of approximately 10° C. The cooked patties had average weights of approximately 85 grams.

Thereafter, the cooked beef patties were treated in the same manner as the beef loin steaks of Example 1. The results of the hedonic scale tests of the beef patties are given in Table 1 below along with hedonic scale test results for other meats and fish.

EXAMPLE 3

Four pork loins were deboned and trimmed free of excess fat. The pork loins were cut and tied to form approximately 2268 gram (5 pound) pork loin roasts, which were then cooked in a convection oven at about 163° C. to an internal temperature of approximately 74° C. Excess juices and fat were discarded. The pork loin roasts were cooled to about 10° C., then sliced to produce cooked slices of pork loin of about 10 mm thickness, each slice weighing approximately 85 grams.

Thereafter, the cooked pork loin slices were treated in the same manner as the beef loin steaks of Example 1. The results of the hedonic scale tests of the pork loin slices are given in Table 1 below along with hedonic scale test results for other meats and fish.

EXAMPLE 4

Pork loin chops were trimmed substantially free of excess fat to produce pork chops each weighing approximately 198 grams. The pork chops were baked in a convection oven at about 135° C. for approximately 90 minutes to an internal temperature of approximately 77° C. Excess juices and fat were discarded. The cooked pork chops were cooled to about 10° C. The cooked pork chops had average weights of approximately 128 grams.

Thereafter, the cooked pork chops were treated in the same manner as the beef loin steaks of Example 1, except that the coating of a dispersion of a calcium salt of carrageenan weighed about 13 grams, thus providing about a 10 percent coating based on the weight of the pork chops. The results of the hedonic scale tests of the pork chops are given in Table 1 below along with hedonic scale test results for other meats and fish.

EXAMPLE 5

Frozen mackerel fillets were tempered until they could be separated. The separated mackerel fillets were baked in an oven at 163° C. for approximately 15 minutes to an internal temperature of about 17° C. The mackerel fillets were then cooled to an internal temperature of approximately 10° C. Approximately 85 gram portions of the cooked mackerel fillets were then treated in the same manner as the beef loin steaks of Example 1. The results of the hedonic scale tests of the cooked mackerel fillets are given in Table 1 below along with hedonic scale test results for the several meats of Examples 1–4 above.

The following Table 1 summarizes the results of the hedonic scale tests of the meats and fish of Examples 1–5 above. As indicated in Example 1, the frozen meat, either uncoated or coated as the case might be, was tempered at about 4° C. overnight, then reheated at about 163° C. in a convection oven to an internal temperature of about 71° C., as also were the portions of cooked mackerel, just before hedonic scale testing.

Table 1

| Meat Type | Hedonic Scale Results | |
|---|---|---|
|  | Flavor | Texture |
| Grilled Beef Loin Steak (Ex. 1) | | |
| Initial results | | |

Table 1-continued

| Meat Type | Hedonic Scale Results | |
|---|---|---|
| | Flavor | Texture |
| Uncoated | 6.7 | 6.6 |
| Coated | 7.0 | 7.0 |
| After six months frozen storage | | |
| Uncoated | 6.6 | 5.9 |
| Coated | 6.9 | 6.3 |
| Broiled Beef Patties (Ex. 2) | | |
| Initial results | | |
| Uncoated | 6.5 | 6.2 |
| Coated | 6.5 | 6.7 |
| After six months frozen storage | | |
| Uncoated | 6.2 | 5.4 |
| Coated | 6.5 | 6.1 |
| Sliced Roast Pork Loin (Ex. 3) | | |
| Initial results | | |
| Uncoated | 6.8 | 6.2 |
| Coated | 6.9 | 6.7 |
| After six months frozen storage | | |
| Uncoated | 6.4 | 5.7 |
| Coated | 6.5 | 6.5 |
| Baked Pork Loin Chops (Ex. 4) | | |
| Initial Results | | |
| Uncoated | 6.8 | 6.1 |
| Coated | 6.9 | 6.5 |
| After six months frozen storage | | |
| Uncoated | 5.7 | 5.9 |
| Coated | 6.4 | 6.0 |
| Baked Mackerel (Ex. 5) | | |
| Initial results | | |
| Uncoated | 6.4 | 6.6 |
| Coated | 6.9 | 7.0 |
| After six months frozen storage | | |
| Uncoated | 4.9 | 5.6 |
| Coated | 5.7 | 6.4 |

Based on the statistical sign test, the data in Table 1 show a significant improvement in the flavor and texture of the coated samples over the uncoated samples. The sensory ratings of flavor were consistently higher in the coated samples than in the uncoated samples, showing that the coating imparted no off flavors to the food products and also gave a slightly improved flavor quality. The textures of the coated samples were consistently improved over the uncoated samples, reflecting the more moist textures of the coated products.

While the invention has been illustrated by examples of cooked beef, cooked pork, and cooked fish, it is to be understood that the invention is applicable to other cooked meat products which are stored in the frozen state, e.g. cooked chicken, other cooked poultry products, other cooked fish or seafood products, and various other forms of cooked beef, pork, and other red meats.

Also, while the invention has been illustrated by examples in which an approximately 1.0 percent by weight dispersion of the calcium salt of carrageenan in water was used for coating the precooked foods, it is to be understood that aqueous dispersions of the calcium salt of carrageenan containing from about 0.25 percent to about 5.0 percent of said calcium salt of carrageenan may be employed for protective coatings on such precooked foods and that substantially uniform coatings of from about 0.025 percent to about 0.5 percent of calcium salt of carrageenan based on the weight of the precooked food may be obtained on the precooked foods to be frozen and stored in the frozen state. If a more dilute dispersion than one containing 1.0 percent calcium salt of carrageenan is employed for coating the precooked food, it may be desirable to apply a higher than 10 percent coating of the dispersion to the precooked food in same cases. Also, if a more concentrated dispersion than one containing 1.0 percent calcium salt of carrageenan is employed for coating the precooked food, it may be desirable to apply less than a 10 percent coating of the dispersion to the precooked food in some cases. Such adjustments will be within the skill of a person having ordinary skill in the art.

The present invention has the advantage that a tightly fitting envelope of an aqueous dispersion of a calcium salt of carrageenan is produced about the cooked meat or other food and that this frozen dispersion effectively prevents or markedly slows down the loss of moisture from the food during freezing or storing of such food in the frozen state over time periods of at least six months. The envelope also probably acts as a barrier against any appreciable absorption of oxygen from the air in which such frozen foods are normally stored. The calcium salt of carrageenan does not of itself impart an objectionable flavor to the meats after they are reheated.

We wish it to be understood that we do not desire to be limited to the exact details described, for obvious modifications will occur to a person skilled in the art.

We claim:

1. A method of extending the storage life in the frozen state of a precooked food such as precooked meat, poultry, and fish which comprises the steps of cooking said food until its internal temperature is sufficiently high to permit eating of said food, coating the precooked food with a coating composition comprising the calcium salt of carrageenan, freezing said precooked food comprising said coating composition, and storing said precooked food comprising said coating composition in the frozen state.

2. The method according to claim 1, wherein said coating composition is an aqueous dispersion of the calcium salt of carrageenan containing from about 0.25 percent to about 5.0 percent of said calcium salt of carrageenan.

3. The method according to claim 2, wherein a sufficient amount of said aqueous dispersion of said calcium salt of carrageenan is deposited on said precooked food to provide a substantially uniform coating on said precooked food of from about 0.025 percent to about 0.5 percent by weight of said calcium salt of carrageenan based on the weight of said precooked food.

4. A frozen precooked food produced in accordance with the method according to claim 1 characterized by having a higher degree of acceptability with respect to texture and flavor after storage in the frozen state for up to six months than that of an uncoated frozen precooked food of the same type after storage in the frozen state for up to six months.

5. A frozen, coated, precooked food comprising a frozen storage life-extending amount of a coating consisting essentially of the calcium salt of carrageenan, said amount of said coating on said frozen, coated, precooked food being from about 0.025 percent to about 0.5 percent by weight of the calcium salt of carrageenan based on the weight of the precooked food prior to application of said coating to said precooked food.

* * * * *